(12) United States Patent
Brusletto et al.

(10) Patent No.: US 10,287,525 B2
(45) Date of Patent: May 14, 2019

(54) METHOD AND APPARATUS FOR PREPARING FUEL FROM BIOMASS

(71) Applicant: Arbaflame Technology AS, Matrand (NO)

(72) Inventors: Rune Brusletto, Jar (NO); Wolfgang Plückhahn, Hamburg (DE)

(73) Assignee: Arbaflame Technology AS, Matrand (NO)

( * ) Notice: Subject to any disclaimer, the term of this patent is extended or adjusted under 35 U.S.C. 154(b) by 127 days.

(21) Appl. No.: 14/769,250

(22) PCT Filed: Feb. 19, 2014

(86) PCT No.: PCT/NO2014/050024
§ 371 (c)(1),
(2) Date: Aug. 20, 2015

(87) PCT Pub. No.: WO2014/129910
PCT Pub. Date: Aug. 28, 2014

(65) Prior Publication Data
US 2016/0002555 A1 Jan. 7, 2016

(30) Foreign Application Priority Data

Feb. 20, 2013 (NO) .................................... 20130279

(51) Int. Cl.
*C10L 5/44* (2006.01)
*C10L 5/00* (2006.01)
(Continued)

(52) U.S. Cl.
CPC ............... *C10L 5/442* (2013.01); *C10L 5/363* (2013.01); *C10L 5/44* (2013.01); *C10L 9/08* (2013.01);
(Continued)

(58) Field of Classification Search
CPC ........... C10L 5/442; C10L 5/363; C10L 9/083
See application file for complete search history.

(56) References Cited

U.S. PATENT DOCUMENTS 3,863,710 A * 2/1975 Masters ................. A01G 13/06
126/59.5
7,905,990 B2 * 3/2011 Freel ....................... C10B 49/22
201/12

FOREIGN PATENT DOCUMENTS

CA 1141376 B 2/1983
CA 1267407 B 4/1990
(Continued)

OTHER PUBLICATIONS

International Search Report and Written Opinion dated May 26, 2014.

*Primary Examiner* — Youngsul Jeong
(74) *Attorney, Agent, or Firm* — Alix, Yale & Ristas, LLP

(57) ABSTRACT

Method and apparatus for preparation of fuel from biomass wherein the biomass is subjected to a heat treatment in a temperature range from 150 to 300 C, in a reactor pressurized with steam and air, wherein the pressure at completed treatment is released. The volume increase of steam and other gases from the pressure release is temporarily accumulated in a container of a flexible volume while steam and other gases are subjected to heat exchange in at least one heat exchanger so that condensable gases are condensed and release their heat of condensation in the at least one heat exchanger.

14 Claims, 1 Drawing Sheet

(51) Int. Cl.
    *C10L 9/08*           (2006.01)
    *C10L 5/36*           (2006.01)
    *B01D 53/00*          (2006.01)
    *B01D 53/34*          (2006.01)

(52) U.S. Cl.
    CPC ............ *C10L 9/083* (2013.01); *B01D 53/002* (2013.01); *B01D 53/343* (2013.01); *C10L 2200/0469* (2013.01); *C10L 2290/06* (2013.01); *C10L 2290/08* (2013.01); *C10L 2290/145* (2013.01); *C10L 2290/148* (2013.01); *Y02E 50/10* (2013.01); *Y02E 50/15* (2013.01); *Y02E 50/30* (2013.01)

(56) References Cited

FOREIGN PATENT DOCUMENTS

| | | |
|---|---|---|
| NO | 320971 B1 | 2/2006 |
| WO | 2006006863 A1 | 1/2006 |
| WO | WO 2006006863 A1 * | 1/2006 .............. C10L 5/363 |

* cited by examiner

METHOD AND APPARATUS FOR PREPARING FUEL FROM BIOMASS

BACKGROUND

The disclosure is related to method and apparatus for improving the manufacturing costs and the reduction of emissions to the air in the preparation of fuels from biomass.

Pellets produced from biomass are increasing with regard to production of thermal electricity as replacement for coal and is thus a contributor to reduction of $CO_2$ emissions. In recent years, pellet production has been dominated by production without heat treatment of the biomass, thus producing so-called first generation pellets or "white pellets". Now focus is changing production of so-called second generation pellets where the biomass is heat treated to change the properties of the biomass. One of these methods utilizes so-called steam explosion method, where biomass is heat treated with steam.

In pellets production which uses steam explosion method as method for heat treatment, such as described in Patent 320 971, or by other related methods of heat treating biomasses or so called ligno-cellulosic material, these methods involve emissions to air which have not been considered adequately. The steam explosion method for pressurizing a container of the supplied biomass and then pressurizing with steam supply, with following instantaneous discharge, also provides a discharge of steam and volatile gases from the mass having being heated.

There are also existing and expired patents that deal with steam treatment of biomass or so-called lignocellulosic materials. These mainly conclude that it is advantageous to apply steam (saturated or superheated steam) to a closed container I which biomass have already been supplied and heating it to a given temperature in the temperature range from 160 degrees up to 300 degrees, depending on the what you want to achieve in the reactor, and then emptying the reactor in one or two steps.

Prior art teaches to vary the degree of filling of the reactor, to vary moisture of supplied biomass, and to calculate the associated, required amount of steam to both heat the biomass (dry material+moisture in the mass) and to create the desired pressure/temperature relationship in the reactor. Typical operation ranges are between 150 and 280 degrees Celsius, but it turns out that the preferred properties for energy purposes are best achieved if the temperature is held between 190 and 235 degrees Celsius, or approximately a pressure from 15 to 28 bars.

When heating the moist biomass in a pressure vessel in which steam is supplied, the steam will condense on the particles to transfer energy to the biomass, and its moisture is heated to the desired temperature range. In addition an amount of steam has to be supplied to achieve the desired total pressure and temperature of the atmosphere surrounding the biomass.

A challenge with this system is that it uses quite a lot of energy to produce the required amount of steam (in the order of 200-600 kg steam per ton of material). A certain amount of biomass is supplied to which the amount of steam to be added is determined as a function of the filling level of the reactor, of the desired pressure and temperature, of the inlet temperature and of the moisture level of the mass to be treated. When there is little mass volume in a reactor, less steam is required to be heated than when more mass is present in the same container/reactor, and drier mass requires less steam to be heated than a wetter material, while the desired pressure/processing temperature will subsequently affect the total steam demand.

Emptying the reactor can be done by emptying in one or more steps, as described in Norwegian patent No. 320,971, Canadian Patent No. 1,267,407 (De Long) or others. One can thus reduce the so-called expulsion pressure to a lower level than the desired operation pressure. This expulsion pressure can be from 1-3 bars up to the processing pressure depending on what is actually desired to achieve. If it is just for emptying the reactor, a lower expulsion pressure is desirable, and if a defibration or a "bursting" of the fibers is desired, a higher expulsion pressure is desired, i.e. greater pressure difference between the reactor and the site to which the mass is discharged (often close to atmospheric pressure or slightly higher in order to reduce the volume).

Emptying/discharge of biomass from a reactor can proceed in the form of a flow through a pipe or passage, expanding towards a volume of lower pressure, where the mass is separated from the steam, so that the mass remains in the tank/separator/cyclone while the steam expands out in the open.

Emptying occurs rapidly, the driving force being the pressure difference. The greater the pressure difference the greater the amount of steam emitted simultaneously with the mass to be used further. When this occurs a large amount of energy is thus released. This energy should preferably be recovered.

During the heat treatment volatile gases (volatiles) are released from the biomass and are mixed with steam and contaminate the steam. The gases produced are mainly organic acids and aldehydes, which are discharged and produced with time. The amount of gas depends on time, temperature and pressure. The primary and predominant initial reaction is the decomposition of hemicellulose to, for example, furfural, formic acid, acetic acid. A plethora of gas components have been observed in the mixture. These gases have different boiling points and are either soluble in water or insoluble in water at different temperature ranges. Several of these gases have a strong odor that is characteristic of the method and many find the smell unpleasant, and it also contains a lot of carbon remains that should rather be reused.

The general problem with heat recovery associated with this type of process is that a large amount of gas and steam are discharged within a few seconds, why there are high demands on heat exchange unit, and in addition the product flow is very complex where volatile (non-condensable) and condensable gases come with a little predictable mass composition. This can lead to a build up of pressure downstream of the process that interferes with the mass flow. In addition to this comes the fact that many of the components are crude in the sense that they have a strong odor and can lead to physical discomfort for personnel who are exposed to them.

SUMMARY

Provide herein is a method and an apparatus for producing fuel from biomass in such a way that energy is being recycled to a larger extent and the disadvantage in the form of unpleasant odors is reduced or eliminated.

The disclosed method and apparatus provides advantages inter alia in pellets production which makes use of the steam explosion method, by allowing energy recovery of the discharge steam while at the same time allowing elimination of the odor problem that is inherent with gases (VOCs) that accompany the steam in the discharge composition.

The container with flexible volume can be a container with flexible walls, or a container having at least one movable wall, such as a cylindrical container with a wall in the form of a movable piston.

Final treatment of the biomass in the form of drying and optional pelletization is not further described here as this can be done in various ways known in the art and does not constitute part of the present invention.

BRIEF DESCRIPTION OF THE DRAWINGS

In the following, the disclosed embodiments are further described by way of non-limiting examples of embodiments with reference to the accompanying drawings.

DETAILED DESCRIPTION

Figure 1:
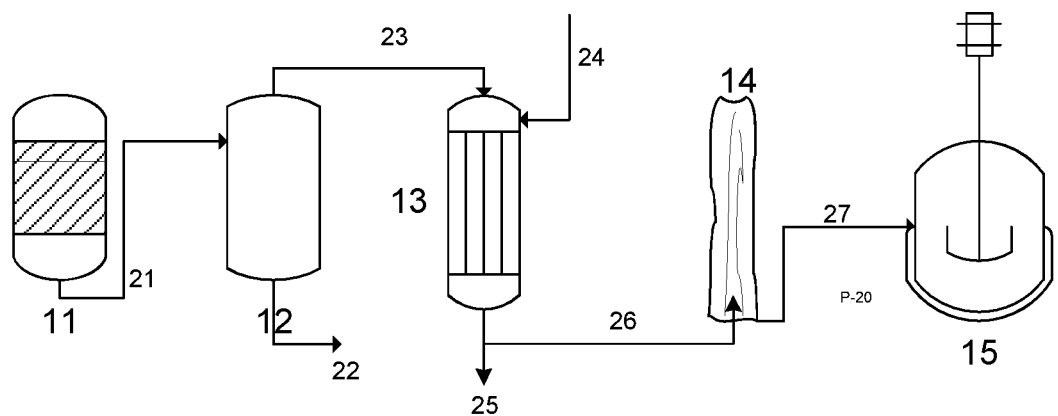
FIG. 1 shows an apparatus in accordance with the disclosure in a certain stage of the process.

FIG. 1 illustrates from left to right, a reactor 11 for heat treatment of wood/pulp/cellulose-containing material. In the reactor 11 is the mass is heated under pressure in the presence of water vapor and air. The mixing ratio between water vapor and air may vary and the filling level of the reactor can likewise vary.

Temperature and residence time in the reactor may vary and are typically in the range from 160 to 300° C. and from 1 to 15 minutes. Higher temperatures and longer processing time are as controlling elements actually undesirable because it provides greater degradation, more mass loss and problems in operating the downstream process in the form of undesirable amounts of non-condensable gases, gases with strong odors, etc.

The reactor typically comprises equipment and devices for controlling and monitoring the process, including valves to control pressure, means for heating and cooling of the reactor respectively, etc. This is not illustrated since it is not key to the process run in the reactor 11.

Container 12 is a pressure release vessel into which the reaction mixture is released at end of treatment. At least a portion of the pressure in the reactor 11 is released abruptly, thereby expelling the reaction mixture from the reactor into the pressure release container 12.

The skilled artisan will appreciate that gases other than steam and air may be present in the reactor, provided that they do not interfere negatively with the process quantities. For example, the ratio between oxygen and nitrogen in the reactor be different from what is the case in air, e.g. through the addition of oxygen enriched air or oxygen consumed during the process.

On completion of reaction treatment the reaction mixture is expelled from the reactor 11 to pressure release tank 12 via conduit 21. This is performed in a manner known in the art. The solid with a certain quantity of moisture is moved into the pressure release tank 12 and transferred via conduit 22 to after-treatment in any suitable manner known in the art. The gas containing condensable components as well as components which are not condensable within the prevailing conditions, passes through conduit 23 at or near the top of the pressure release tank 12 and is led therefrom directly to at least a heat exchanger 13.

The heat exchanger 13 cools the gas flow and ensures that the condensable components of the gas are condensed, so as to thereby reduce the volume of the gas flow. The heat of condensation received by the refrigerant is utilized as energy in any suitable manner within or outside the current process. Typically, this energy is used to preheat the air for a drying unit or for combustion. The condensate from the heat exchanger 13 contains, in addition to water, components which should be removed before the water is discharged or recycled for reuse. The condensate is discharged through conduit 25, while the gas passes to the next step in the process through conduit 26.

As regards the heat exchanger or heat exchangers 13 this or these can be indirect heat exchangers where the refrigerant is kept separate from the vent gases or it can be direct heat exchangers where cooling water is mixed with the vent gases. It can also be a combination, where the heat exchange mainly is indirect, but where water 24 at a limited rate is sprayed into the flow of discharge gases into the heat exchanger 13 to cause a quenching of the discharge gases 23 to thereby more easily condense all condensable components in the subsequent indirect step of heat exchange.

If one chooses to use only direct heat exchange, a much larger volume of fluid needs to be handled downstream of the heat exchanger. It is therefore preferred that the heat exchange at least partially is conducted as indirect heat exchange.

The next step of the process utilizes a container 14 with flexible volume, typically a "balloon", which like other balloons has soft walls and is dimensioned so that it is able to receive the "puff" of non-condensable gases resulting from expulsion from a batch reactor operated under normal operating conditions. In FIG. 1, the reaction mixture is still enclosed in the reactor 11 and container 14 with flexible volume is therefore substantially empty, as is shown in the figure.

Figure 2:
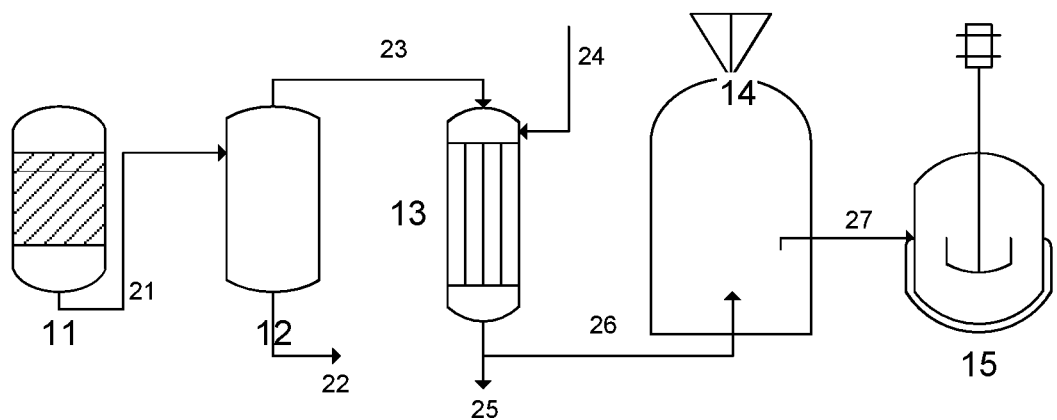
FIG. 2 shows the apparatus of FIG. 1 in another step of the process.

Referring now to FIG. 2, which shows the same as FIG. 1 except that here the pressure in the reactor has just been released so that the reaction mixture has been expelled into the pressure release tank 12 while the gas is blown on to the container 14 with flexible volume through the heat exchanger 13 and conduits 23 and 26. Within a few seconds after the pressure is released, the container 14 is inflated by non-condensable gases as shown in FIG. 2. The container 14 will typically be oversized in relation to the need that can be calculated based on a single batch. In addition, a safety valve can ensure that the container 14 does not burst even in case of extreme amounts of non condensable gases. The container 14 will, for each batch, for a short period of time, occupy the entire amount of non-condensable gases without thereby causing any significant overpressure, and then slowly and in a controlled manner release the gas via conduit 27 to at least one chamber 15 for after-treatment of the gases, ensuring that the gases do not escape to the atmosphere untreated. Here any flammable components may be burned and the combustion heat may be taken care of through appropriate cooling of the chamber and/or of the exhaust gases.

After-treatment can be conducted in multiple chambers 15, arranged in series, parallel or a combination of series and parallel. This is not essential to the inventive concepts. What is important is what takes place in the form of heat exchange in heat exchanger(s) 13 and temporary accumulation of non-condensable gases in a container 14 with flexible volume. This combination is unique and indicates that the heat energy that one previously was not able to take care of in this type of batch processes, now is possible to recover in order to achieve a process with a lower net energy consumption and thereby a more profitable process. In addition one achieves the bonus that gases with harmful or unpleasant odors are taken care of.

It is furthermore possible to reduce the load on the heat exchanger by placing a container with flexible volume upstream thereof, to reduce the rate at which released gases pass through the heat exchanger. The disadvantage of this is that all "unclean" components will still be present in the gas and parts of these will adhere to the walls of the container 14 with the flexible volume.

With regard to the need for dimensioning, a typical reactor for the purpose in question can have a volume of 10 m$^3$ and with a pressure of 25 bars, the pressure release will produce up to approx. 250 m$^3$ gas that needs to be taken care of. In practice, the amount of gas will be somewhat less because part of the reactor volume is occupied by the biomass and because some of the pressure can be vented out carefully prior to the sudden pressure release. By appropriately controlling of the process, the volume which is discharged in one quick pressure surge lasting approximately for 5 seconds, may be decreased to approximately 70 m$^3$. The specific heat of vaporization of water is 242 kJ/mole or 13.45 MJ/kg. If 50% of these 70 m$^3$ is water vapor (about 1 kg/m$^3$), the immediate need for heat transfer in heat exchangers will amount to:

$$35 \text{ kg}/5 \text{ sek} \times 13.45 \text{ MJ/kg} = 95 \text{ MW}$$

provided all available vapors will condense. The processes can naturally be controlled so that this need larger or smaller, the figures given as an example of sizing needs, but also to shed light on the challenges of success in managing such energy-rich "impacts". If condensation capacity is not sufficient a pressure build-up will take place. The prerequisite for respite and escape out through the condensing unit is that the capacity is so large that the pressure drop does not increase excessively.

The part of the reduction of the steam impact caused by introduction/self-production of volatile gases, means that the impact of non-condensable gases is increased to a volume of from 25 to 150 m$^3$ per ton biomass or up to 30 m$^3$ per second. This must be considered a large useless volume in relation to the reactor size. This pressure impact is large and must be collected and then passed on as a continuous flow. To collect a large quantity of gas in a short time at such a low pressure, is a demanding task which according to the present invention is solved by the container with the flexible volume.

After-treatment must also be performed on both water and gas. This is made according to known technology once the process is carried out in accordance with the disclosure.

Example

If the desired reactor is 10 m$^3$ and this is supplied with 5 m$^3$ of biomass (wood chip or similar) then that corresponds to a ton of mass.
Variation of moisture in reactor per ton mass

| Dry matter | 400 | 600 | 700 | 900 | Kg |
|---|---|---|---|---|---|
| Spec heat wood mass | 0.65 | 0.65 | 0.65 | 0.65 | Kcal/kg |
| Diff temp | 145 | 145 | 145 | 145 | Degrees Celsius |
| enthalpy | 37700 | 56550 | 65975 | 84825 | Kcal |
| Water | 600 | 400 | 300 | 100 | Kg |
| Spec heat water | 1 | 1 | 1 | 1 | Kcal/kg |
| diff temp | 145 | 145 | 145 | 145 | degrees |
| enthalpy | 87000 | 58000 | 43500 | 14500 | Kcal |
| sum Kcal | 124700 | 114550 | 109475 | 99325 | sum kcal |
| Required energy | 514.8 | 472.9 | 451.9 | 410.0 | GJ/ton |

Required amount of steam

| | &0% moisture | 10% moisture | |
|---|---|---|---|
| Energy requirement | 514.8 | 410.0 | GJ/T |
| Enthalpy evaporation | 1870 | 1870 | |
| Enthalpy water | 920 | 920 | |
| sum | 2790 | 2790 | |
| uses | 1870 | 1870 | |
| eq kg steam | 275.274 | 219.259 | Suppl. Amount steam vs. material moisture |

In addition, steam is needed to provide a desired vapor pressure.

Filling level 50% means that approximately 70% of the volume is filled with steam to provide steam pressure, and at a reduction/expulsion pressure of 10 bars, there will be 75 kg steam in the reactor.
Required amount of steam to obtain the vapor pressure;

$$75\% \text{ of the volume} * 10 \text{ bar} * 1 \text{ kg/m}^3 = 75 \text{ kg}$$

Volume of the puff and volume of non-condensable gases can thereafter be calculated.
Per ton mass supplied

| Moisture as water | 600 | 100 | kg |
|---|---|---|---|
| enthalpy | 350 | 350 | |
| Enthalpy water | 306346 | 111741 | |
| Dry matter | 400 | 900 | |
| Spec enthalpy TS | 228 | 228 | |
| Enthalpy TS | 91000 | 204750 | |
| Sum Diff enthalpy | 397346 | 316491 | |
| kg evaporated | 212 | 169 | Puff |
| As moisture increase | 63 | 50 | condensate |
| pressure | 75 | 75 | |
| Sum Puff | 287 | 244 | kg |
| Mass loss becomes NCG | 100 | 100 | kg |

This means that for a typical volume and operation range 180-235° C., the condensable volume is 25-35 times the reactor volume and the non-condensable gases corresponds to the mass loss in the reactor, ranging from 0-30 times the reactor volume. Both volumes are slightly changed when it turns out that the mass loss becomes both water and non-condensable gases depending on the pressure/time/temperature in the reactor. The example shows that the immediate impact is huge.

The invention claimed is:
1. A method for the preparation of solid biomass fuels from biomass feed, comprising:
heating an initial biomass feed to a temperature within an approximate range of 150° C. to 300° C. in a reactor vessel (11) under pressure in the presence of steam and gases comprising air to produce a heated biomass and a product gas comprising steam and air;
releasing pressure in said reactor vessel (11), thereby expelling the heated biomass into a pressure release tank (12);
passing said product gas through at least one heat exchanger (13) to condense condensable gases contained in the product gas and release resulting heat of condensation in the at least one heat exchanger (13);

accumulating a volume of non-condensed gases (26) resulting from the at least one heat exchanger (13) temporarily in at least one flexible container (14) before releasing the volume of non-condensed gases from the at least one flexible container (14) to at least one chamber (15); and purifying the volume of non-condensed gases in the at least one chamber (15) to produce a purified gas, and discharging the purified gas to the atmosphere, wherein said purifying in the at least one chamber (15) comprises burning combustible components contained in the volume of non-condensed gases in a combustion chamber and recovering heat from the combustion chamber.

2. The method of claim 1, wherein the at least one flexible container (14) is located downstream of the at least one heat exchanger (13).

3. The method of claim 1, wherein the at least one heat exchanger (13) absorbs heat from condensation of condensable gases, and at least a portion of said heat of condensation is used to preheat supply water from which the steam is produced.

4. The method of claim 1, wherein said condensable gases are collected as condensate (25) which is separated from the volume of non-condensed gases (26).

5. The method of claim 4, comprising steps of purifying the condensate (25) to produce a purified condensate and discharging the purified condensate.

6. The method of claim 1, wherein the initial biomass feed comprises a cellulosic material, and at least part of the releasing pressure defibrates the cellulosic material.

7. The method of claim 6, comprising heating the cellulosic material to a temperature within an approximate range of 200° C. and 240° C. to soften lignin present in the cellulosic material.

8. The method of claim 1, wherein the steam is saturated steam.

9. The method of claim 1, wherein the steam is superheated steam.

10. The method of claim 1, comprising a step of drying the heated biomass into a dried biomass.

11. The method of claim 10, comprising a step of forming the dried biomass into pellets.

12. The method of claim 1, comprising a step of forming the heated biomass into pellets.

13. The method of claim 1, wherein the heating of the initial biomass feed has a predetermined duration within an approximate range of 1-30 minutes.

14. The method of claim 1, wherein the initial biomass feed has an initial moisture content within a range of approximately 10 wt %-60 wt prior to heating.

* * * * *

UNITED STATES PATENT AND TRADEMARK OFFICE
CERTIFICATE OF CORRECTION

PATENT NO. : 10,287,525 B2
APPLICATION NO. : 14/769250
DATED : May 14, 2019
INVENTOR(S) : Rune Brusletto and Wolfgang Pluckhahn Page 1 of 1

It is certified that error appears in the above-identified patent and that said Letters Patent is hereby corrected as shown below:

In the Claims

Column 8, Line 25 in Claim 14:
After "60 wt" insert --%--

Signed and Sealed this
Thirtieth Day of July, 2019

Andrei Iancu
*Director of the United States Patent and Trademark Office*